(12) United States Patent
Mermillod et al.

(10) Patent No.: US 12,730,310 B2
(45) Date of Patent: Sep. 8, 2026

(54) HEAD-UP DISPLAY

(71) Applicant: VALEO COMFORT AND DRIVING ASSISTANCE, Créteil (FR)

(72) Inventors: Pierre Mermillod, Créteil (FR); Stephane Gache, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 254 days.

(21) Appl. No.: 18/720,502

(22) PCT Filed: Dec. 15, 2022

(86) PCT No.: PCT/EP2022/086086
§ 371 (c)(1),
(2) Date: Jun. 14, 2024

(87) PCT Pub. No.: WO2023/111149
PCT Pub. Date: Jun. 22, 2023

(65) Prior Publication Data

US 2025/0053004 A1 Feb. 13, 2025

(30) Foreign Application Priority Data

Dec. 16, 2021 (FR) ...................................... 2113721

(51) Int. Cl.
*G02B 27/01* (2006.01)

(52) U.S. Cl.
CPC ................................ *G02B 27/0101* (2013.01)

(58) Field of Classification Search
CPC ................................................. G02B 27/0101
See application file for complete search history.

(56) References Cited

FOREIGN PATENT DOCUMENTS

| FR | 3102569 | * | 4/2021 | ............. G02B 27/01 |
|---|---|---|---|---|
| FR | 3102569 A1 | | 4/2021 | |

OTHER PUBLICATIONS

International Search Report issued in International Patent Application No. PCT/EP2022/086086, mailed on Mar. 3, 2023 (4 pages).
Written Opinion issued in International Patent Application No. PCT/EP2022/086086, mailed on Mar. 3, 2023 (4 pages).

* cited by examiner

*Primary Examiner* — Joseph P Martinez
(74) *Attorney, Agent, or Firm* — Osha Bergman Watanabe & Burton LLP

(57) ABSTRACT

A head-up display includes, inside a housing, an image-generating device configured to generate a light beam which passes through an optical output element, a first reflector configured to reflect the light beam as an intermediate beam, and a second reflector configured to reflect the intermediate beam as an output beam. The housing includes an opening closed by a window through which the output beam passes. The propagation of light through the optical output element, in reflection on the first reflector, in reflection on the second reflector, and through the window, defines an optical path with two ends. Two elements from the optical output element, the first and second reflectors, and the window are provided, respectively, with a first and second spectral filter. The first and second spectral filter are configured to prevent the propagation of a spectral component of the light beam.

9 Claims, 3 Drawing Sheets

[Fig. 1]
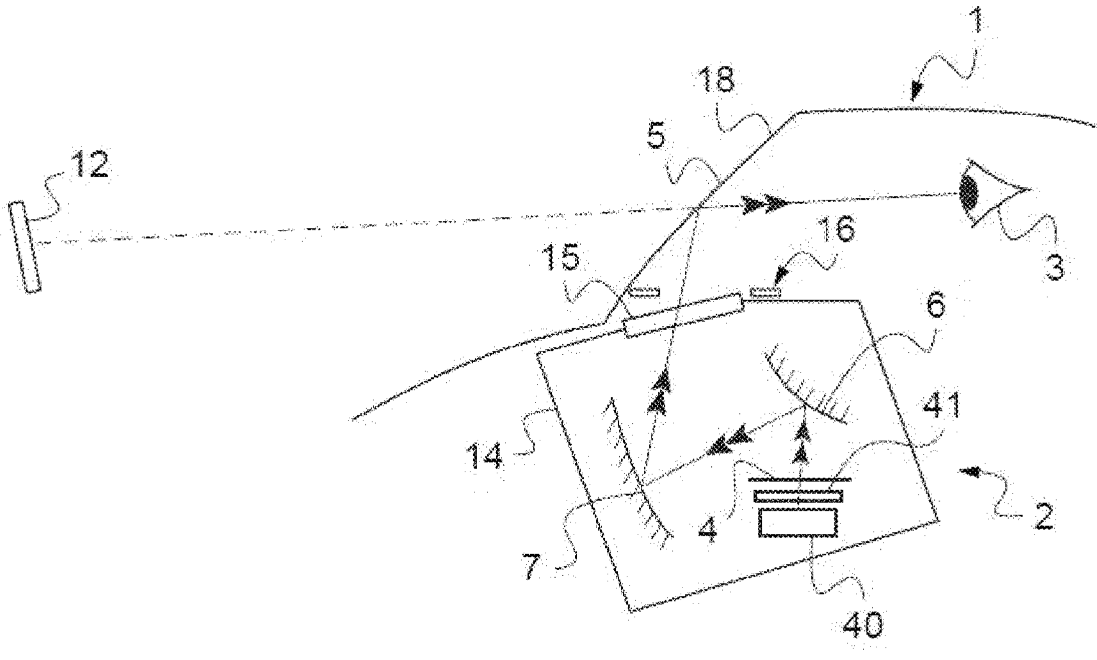
[Fig. 2]
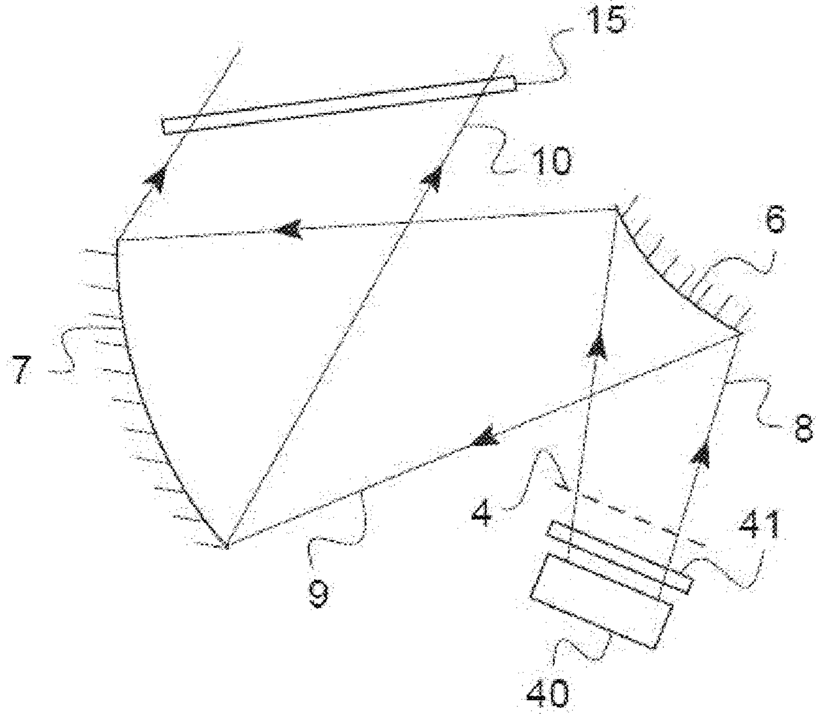

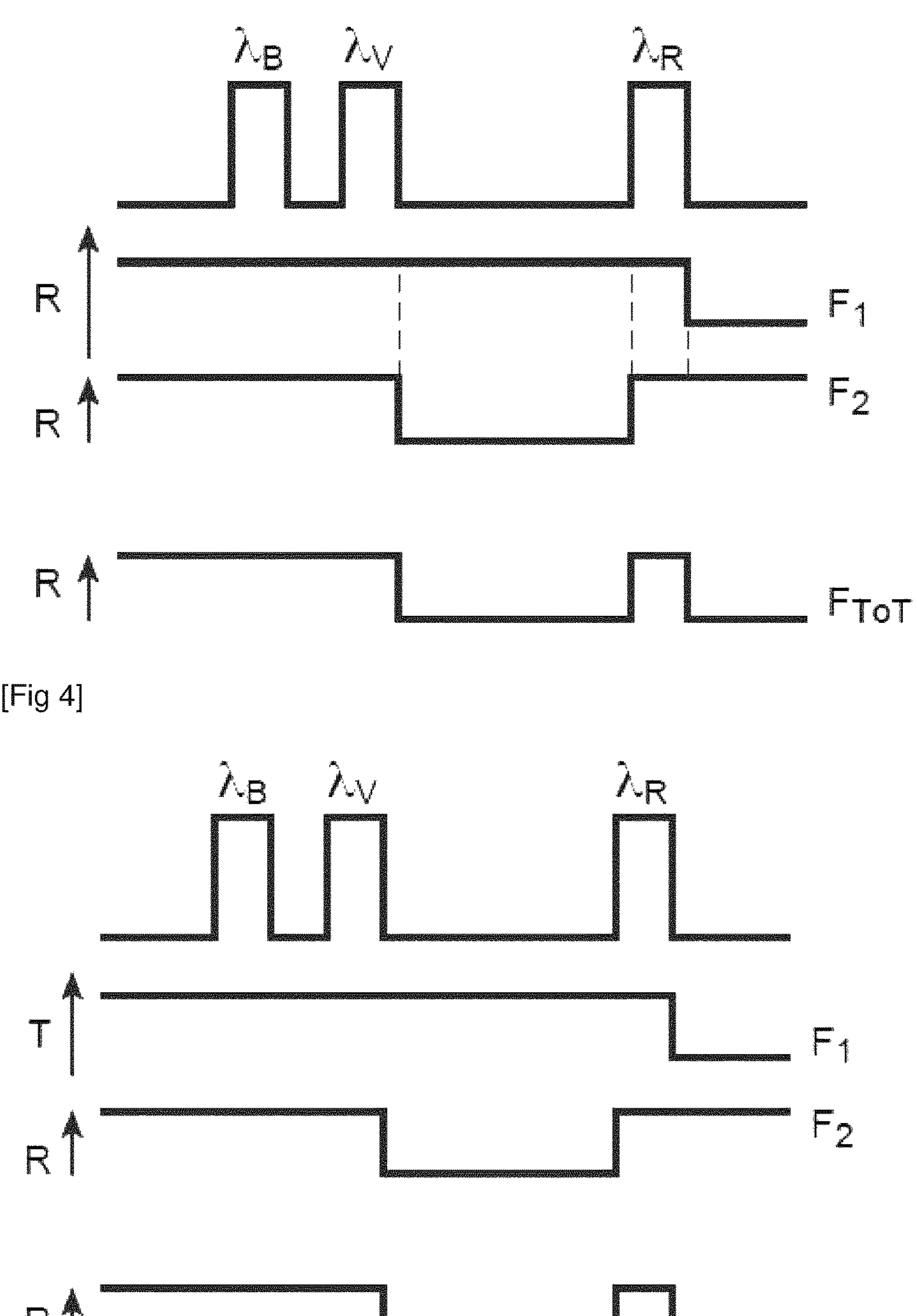
[Fig. 3]
$\lambda_B$
$\lambda_V$
$\lambda_R$
R
$F_1$
R
$F_2$
R
$F_{ToT}$
[Fig 4]
$\lambda_B$
$\lambda_V$
$\lambda_R$
T
$F_1$
R
$F_2$
R
$F_{ToT}$

[Fig 5]
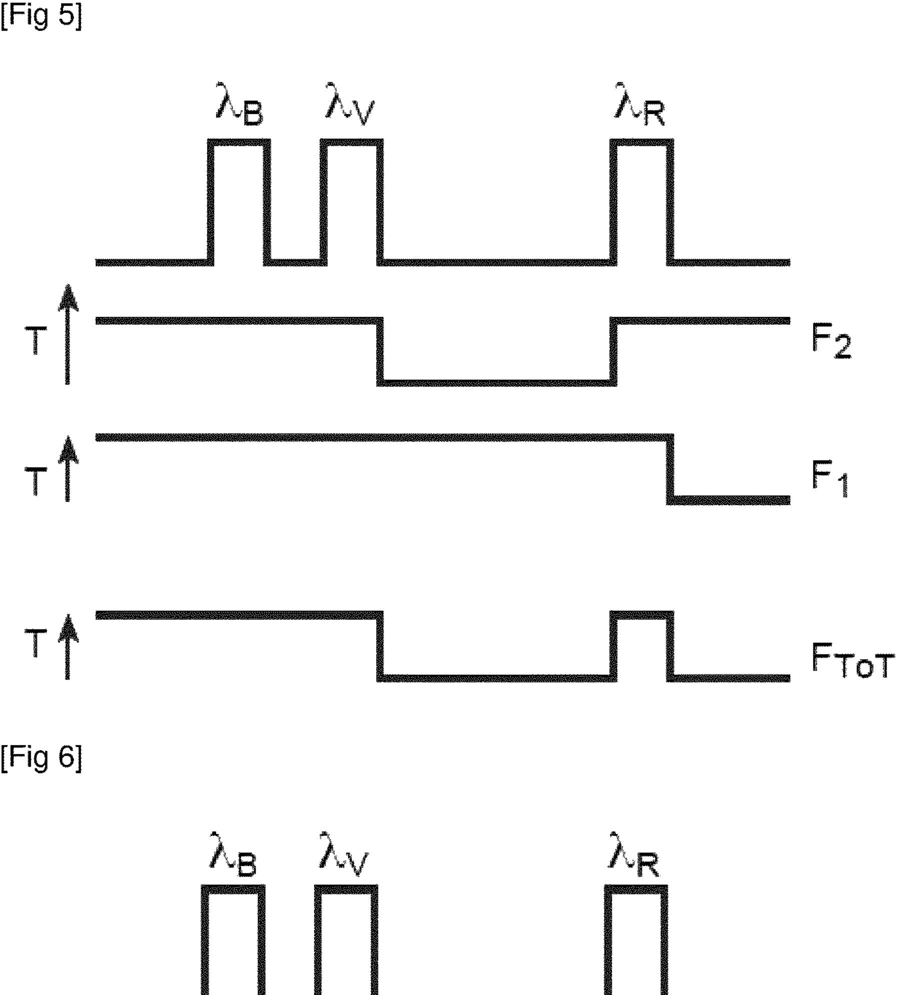
[Fig 6]
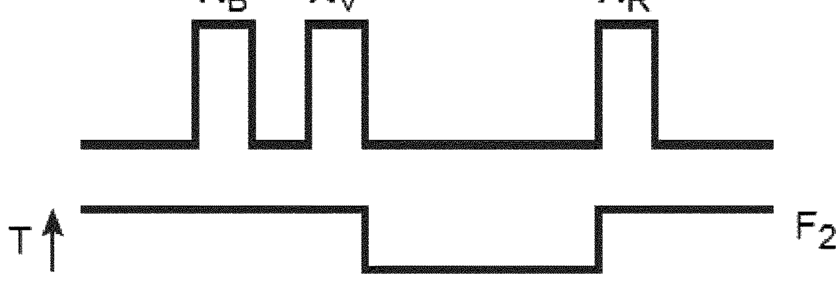

HEAD-UP DISPLAY

The present invention relates in general to the field of displays.

It relates more particularly to a head-up display for a motor vehicle.

For the driver of a motor vehicle, it is particularly convenient to be able to view information relating to the operation of the vehicle, relating to a traffic lane ahead of the vehicle and so on without having to avert their gaze from this traffic lane in order to do so.

For this purpose, it is known practice to equip the motor vehicle with a display referred to as a "head-up" display comprising, inside a housing, an image-generating device from which a source light beam emerges and an optical projection system which is suitable for projecting an image generated by the image-generating device toward the user, via the windshield for example, so as to form a virtual image in the field of view of a driver of said motor vehicle.

The virtual image, comprising the information to be displayed, is then superimposed visually on the environment ahead of the vehicle.

A phenomenon to be limited in such a display is that of solar load, that is to say of the penetration of solar radiation into the display. It is, indeed, liable to damage the components which make up the display, in particular the image-generating device.

There are displays made up of elements provided with narrow band-pass filters centered around the wavelengths emitted by the image-generating device of the display. These filters make it possible to preserve the color rendering of the images which are generated by the image-generating device in the virtual images formed. On the other hand, they make it possible at the same time to prevent the other spectral components of solar radiation from propagating inside the display, such as the components in the infrared, which may be particularly damaging because of the heat which they are liable to concentrate in it. However, such filters are expensive and therefore represent an economic limitation.

In order to remedy this problem, the present invention proposes a head-up display comprising, inside a housing:

- an image-generating device designed to generate a light beam which passes through an optical output element, the light beam comprising a green component and a red component;
- a first reflector designed to reflect the light beam as an intermediate beam;
- a second reflector designed to reflect the intermediate beam as an output beam, the housing comprising an opening closed by a window through which the output beam passes, the propagation of light through the optical output element, in reflection on the first reflector, in reflection on the second reflector and through the window, defining an optical path having two ends,
- wherein two elements from the optical output element, the first reflector, the second reflector and the window are provided, respectively, with a first spectral filter and with a second spectral filter,
- characterized in that the first spectral filter and the second spectral filter are configured to prevent the propagation, from one end to the other of the optical path, of a spectral component extending spectrally between the green component and the red component.

According to the invention, the green component and the red component of the light beam which is generated by the image-generating device pass through the display in order to form a virtual image in the field of view of a driver. This virtual image therefore contains the color content of the light beam generated by the image-generating device, which is therefore not altered. In parallel, according to the invention, the combination of two spectral filters prevents the propagation of any spectral component between the green component and the red component inside the display and blocks, in particular, this spectral region of solar radiation. Thus, the invention has the advantage of reducing the phenomenon of solar load within the display without altering the color content of the images formed by it, in particular of preventing the propagation, in the display, of a spectral component with a wide band in the visible spectrum.

In one embodiment, the first spectral filter and the second spectral filter are configured to prevent the propagation, from one end to the other of the optical path, of another spectral component extending spectrally over the infrared spectrum.

This makes it possible to further reduce the solar load within the display by preventing the infrared spectral component of solar radiation from propagating in the display, in addition to a spectral component with a wide band in the visible spectrum, by virtue of using two spectral filters, and therefore to propose a display with reduced solar load which is less expensive to design.

In one embodiment, one spectral filter from the first spectral filter and the second spectral filter is a band-stop filter and the other spectral filter is a low-pass filter.

Such a configuration makes manufacturing the components of the display easy and inexpensive because of the simplicity of manufacturing a low-pass filter and a band-stop filter.

For example, the two elements are the first reflector and the second reflector.

In another example, the two elements are one from the first reflector and the second reflector, and the window.

In a third example, the two elements are one from the first reflector and the second reflector, and the optical output element.

In another example, the two elements are the optical output element and the window.

According to one possible embodiment:

- the light beam comprises a blue component, and/or
- an additional element from the optical output element, the first reflector, the second reflector and the window, which is different from the two elements, is provided with a third spectral filter, and/or
- the third spectral filter is configured to prevent the propagation, from one end to the other of the optical path, of a spectral component extending spectrally between the blue component and the green component.

The advantage of this variant is to make it possible, by adding a filter, to further reduce the solar load by preventing the propagation of the wavelengths between the blue component and the green component, while at the same time preserving the color content of the images which are formed by the display. Indeed, the red component, the green component and the blue component passing through the whole display makes it possible to form spectrally unaltered color images.

In a third embodiment, the third spectral filter is a band-stop filter.

Such a filter is simple to manufacture and thus makes it easy to design the display, the latter reducing the phenomenon of solar load optimally while at the same time preserving the color quality of the images which it forms.

Of course, the various features, variants and embodiments of the invention can be associated with one another in various combinations insofar as they are not incompatible or mutually exclusive.

In addition, various other features of the invention will become apparent from the appended description, which is provided with reference to the drawings, which illustrate non-limiting embodiments of the invention and in which:

FIG. 1 is a schematic view showing the integration of a head-up display according to the invention into a motor vehicle.

FIG. 2 is an enlarged view of one embodiment of the head-up display of FIG. 1 showing the journey of the light rays originating from the image-generating device through the head-up display.

FIG. 3 is a schematic depiction of the spectra of a first spectral filter and of a second spectral filter in a first embodiment of the invention.

FIG. 4 is a schematic depiction of the spectra of the first spectral filter and of the second spectral filter in a second embodiment of the invention.

FIG. 5 is a schematic depiction of the spectra of the first spectral filter and of the second spectral filter in a third embodiment of the invention.

FIG. 6 is a schematic depiction of the spectra of the first spectral filter, of the second spectral filter and of a third spectral filter in a variant of the third embodiment of the invention.

It should be noted that in these figures the structural and/or functional elements shared by the different variants can have the same reference signs.

FIG. 1 schematically depicts, from the side, a motor vehicle 1, equipped with a head-up display 2 according to the invention. An individual, here the driver 3 (of whom only an eye is depicted), is located in the passenger compartment of the vehicle.

The head-up display 2 first of all comprises a housing 14 which is generally placed under a dashboard 16 of the vehicle 1 and has, here in its upper part close to the dashboard 16, an opening closed by a transparent window 15 which is suitable for letting the light beam useful to the operation of the display 2 pass, as explained below.

As FIG. 1 shows, the head-up display 2 comprises, inside this housing 14, an image-generating device 40 generating an image, and an optical projection system comprising a first reflector 6 and a second reflector 7.

The image-generating device 40 may, for example, comprise a laser scan comprising one or more laser sources scanning a pixel matrix and generating a dot matrix on a diffuser. What is meant by diffuser is an optical element intended to uniformly distribute the light emanating from a light source. The image-generating device 40 may, as a variant, comprise a Digital Light Processing (DLP) projector. As another example, the image-generating device 40 may comprise a liquid crystal on silicon (LCoS) screen. In this case, one particular configuration is a holographic system, where the liquid crystal on silicon screen is used as a spatial light modulator, and where the beam originating from the LCoS screen undergoes a Fourier transform before reaching a diffuser.

In any case, according to the invention, the image-generating device 40 comprises three monochromatic sources: a source emitting a blue component, a source emitting a green component and a source emitting a red component, respectively. For example, the three monochromatic sources are three laser sources. In another example, the three monochromatic sources are three light-emitting diodes each emitting over a very restricted range of wavelengths.

The images generated by the image-generating device 40 are generated in accordance with a control signal originating from the on-board computer (which is not depicted) of the vehicle 1.

FIG. 2 is an enlarged view of one embodiment of the display 2. The journey of the light inside the display 2 is depicted.

The image-generating device 40 emits a light beam 8. The light beam 8 passes through an image plane 4, generating an intermediate image thereon. An optical output element 41 intercepts the light beam 8. The optical output element 41 is, for example, a diffuser. What is meant by diffuser is an optical element intended to uniformly distribute the light emanating from a light source. Alternatively, in the case where the image-generating device 40 is a TFT display or a DLP projector, or a laser scan, the optical output element 41 may be a ceramic strip having a high thermal conduction coefficient, which makes it possible to release the heat which it receives.

After having passed through the optical output element 41, the light beam 8 is intercepted by the first reflector 6, which reflects it as an intermediate beam 9. The intermediate beam 9 is intercepted by the second reflector 7, which reflects it as an output beam 10. The output beam 10 passes through the window 15 in order to project toward a partially transparent strip 5 so as to form a virtual image 12 at a determined projection distance. Here, the partially transparent strip 5 is the windshield of the vehicle 1. As a variant, however, the partially transparent strip 5 could be a dedicated combiner, for example located between the windshield of the vehicle and the window 15 of the housing of the head-up display 2.

The propagation of light through the optical output element 41, then in reflection on the first reflector 6, then in reflection on the second reflector 7 and through the window 15 defines an optical path L having an inner end and an outer end. The inner end is located upstream of the optical output element 41. The outer end is located downstream of the window 15.

The invention aims to limit the propagation of solar radiation through the display 2 while affecting the quality of the virtual image formed in the field of view of the driver 3 as little as possible. The idea underlying the invention consists in preventing the propagation of as large as possible a portion of solar radiation from the outer end toward the inner end of the above-mentioned optical path L, while at the same time making the propagation of the red component, green component and blue component which are emitted by the image-generating device 40 from the inner end toward the outer end of the optical path L possible.

Below, it will be described how this goal can be reached by the combination of two spectral filters which are simple to manufacture relative to the filters used in the prior art. It is envisaged to apply these two spectral filters to two elements chosen from the optical output element 41, the first reflector 6, the second reflector 7 and the window 15.

The spectral proximity of the green component and blue component which are emitted by the image-generating device 40 is used here. Typically, the green component is centered around 530 nm and the blue component is centered around 450 nm. The red component is, for its part, typically centered around 650 nm. Thus, the combination of a filter which lets a spectral band including the green component and the blue component propagate along the optical path L with a filter which prevents the propagation, on the optical path L, of a spectral band extending between the green component and the red component makes it possible to transmit the three—red, green and blue—components, while at the same time suppressing the wavelengths between the green component and the red component.

Furthermore, the invention also aims to limit the propagation of the spectral bands extending in the infrared and the ultraviolet of solar radiation inside the display 2.

The two spectral filters consist of a first, low-pass, spectral filter F1 and a second, band-stop, spectral filter F2. What is meant by low-pass filter is a filter which makes the propagation of short wavelengths along the optical path L as defined above possible. What is meant by band-stop filter is a filter which prevents the propagation of wavelengths of a determined spectral band along the optical path L as defined above.

In a first embodiment, the first, low-pass, spectral filter F1 is applied to the first reflector 6, and the second, band-stop, spectral filter F2 is applied to the second reflector 7.

In this embodiment, the first reflector 6 is a cold mirror, that is to say that it reflects the electromagnetic spectrum up to 700 nm. Thus, it does not let infrared solar radiation propagate along the optical path L. Infrared solar radiation therefore does not reach the image-generating device 40 and does not damage it. Furthermore, the second reflector 7 reflects only the spectral band extending from the ultraviolet to 530 nm and the spectral band extending between 650 nm and the infrared. Thus, the second reflector 7 does not reflect the portion of solar radiation extending spectrally between 530 nm (green component) and 650 nm (red component) and prevents the propagation of it inside the display 2. In parallel, the first reflector 6 and the second reflector 7 both reflect the red component (650 nm), the green component (530 nm) and the blue component (450 nm) making up the emission spectrum of the light beam emitted by the image-generating device 40, and make it possible for it to propagate along the optical path L in order to form the virtual image 12 without color content being altered.

The indicated numerical wavelength values are orders of magnitude, and any other value recognized by a person skilled in the art as representing a red spectral component, a green spectral component or a blue spectral component may be used in the context of the invention.

FIG. 3 illustrates the reflection spectra of the first spectral filter F1 and of the second spectral filter F2. It may be observed, on the curve $F_{TOT}$, that the combination of the first spectral filter F1 with the second spectral filter F2 makes it possible to let the red spectral component $\lambda_R$, the green spectral component $\lambda_V$ and the blue spectral component $\lambda_B$ pass.

It should be noted that the window 15, made of glass or made of plastic, contributes to the absorption of the spectral portion of solar radiation extending in the ultraviolet and prevents the propagation of this portion inside the display 2.

In a second embodiment, the first, low-pass, spectral filter F1 is applied either to the window 15 or to the optical output element 41. As for the second, band-stop, spectral filter F2, it is then applied either to the first reflector 6 or to the second reflector 7.

In this embodiment, the first spectral filter F1 transmits the visible spectral band and reflects the spectral band extending over the infrared spectrum, for example beyond 700 nm. Thus, if the first spectral filter F1 is applied to the window 15, the latter reflects the spectral portion of solar radiation which reaches it, preventing this spectral portion from penetrating inside the display 2. If the first spectral filter F1 is applied to the optical output element 41, the latter reflects the spectral portion of solar radiation extending over the infrared spectrum which reaches it, which avoids the propagation of this portion as far as the image-generating device 40 as well as any thermal damage to the latter.

Furthermore, still in this embodiment, the second spectral filter F2 reflects only the spectral band extending from the ultraviolet to 530 nm and the spectral band extending between 650 nm and the infrared. The second spectral filter transmits or, as a variant, absorbs the spectral band extending between 530 nm (green component) and 650 nm (red component). The spectral portion of solar radiation extending between these two components is therefore not reflected and is therefore stopped while propagating inside the display 2 (by the first reflector 6 or the second reflector 7 according to the circumstances).

Thus, in this embodiment, the first spectral filter F1 and the second spectral filter F2 are configured to prevent the propagation, from one end to the other of the optical path L, of a spectral component extending spectrally over the infrared spectrum and of a spectral component extending spectrally between the green component and the red component, respectively.

In parallel, the red component (650 nm), the green component (530 nm) and the blue component (450 nm) making up the emission spectrum of the light beam emitted by the image-generating device 40 are not blocked along the optical path L. In other words, the light beam emitted by the image-generating device 40 propagates along the optical path L in order to form the virtual image 12 without color content being altered.

As above, the indicated numerical wavelength values are orders of magnitude, and any other value recognized by a person skilled in the art as representing a red spectral component, a green spectral component or a blue spectral component may be used in the context of the invention.

FIG. 4 illustrates the transmission spectrum of the first spectral filter F1 and the reflection spectrum of the second spectral filter F2 according to the second embodiment. It may be observed, on the curve $F_{TOT}$, that the combination of the first spectral filter F1 with the second spectral filter F2 makes it possible to let the red spectral component $\lambda_R$, the green spectral component $\lambda_V$ and the blue spectral component $\lambda_B$ pass.

As in the first embodiment, the window 15, made of glass or made of plastic, contributes to the absorption of the spectral portion of solar radiation extending in the ultraviolet and prevents the propagation of this portion inside the display 2.

In a third embodiment, the first spectral filter F1 is applied to the optical output element 41, and the second spectral filter F2 is applied to the window 15.

In this embodiment, the first spectral filter F1 transmits the visible spectral band and reflects the spectral band extending over the infrared spectrum, for example beyond 700 nm. Thus, applied to the optical output element 41, the latter reflects the spectral portion of solar radiation extending over the infrared spectrum which reaches it and is therefore not damaged by this portion of solar radiation. Furthermore, the second spectral filter F2 transmits only the spectral band extending from the ultraviolet to 530 nm and the spectral band extending between 650 nm and the infrared and absorbs the spectral band extending spectrally between 530 nm (green component) and 650 nm (red component). The spectral portion of solar radiation extending between these two components is therefore stopped by the window 15 and therefore does not propagate on the optical path L, inside the display 2.

In parallel, the red component (650 nm), the green component (530 nm) and the blue component (450 nm) making up the emission spectrum of the light beam emitted by the image-generating device 40 are not blocked along the optical path L. In other words, the light beam emitted by the image-generating device 40 propagates along the optical path L in order to form the virtual image 12 without color content being altered.

As above, the indicated numerical wavelength values are orders of magnitude, and any other value recognized by a person skilled in the art as representing a red spectral component, a green spectral component or a blue spectral component may be used in the context of the invention.

FIG. 5 illustrates the transmission spectra of the first spectral filter F1 and of the second spectral filter F2 according to the third embodiment. Here again it may be observed, on the curve $F_{TOT}$, that the combination of the first spectral filter F1 with the second spectral filter F2 makes it possible to let the red spectral component $\lambda_R$, the green spectral component $\lambda_V$ and the blue spectral component $\lambda_B$ pass, but that this combination prevents the propagation, from one end to the other of the optical path L, of the spectral component extending spectrally between the green component $\lambda_V$ and the red component $\lambda_R$.

As in the first and second embodiments, the window 15, made of glass or made of plastic, contributes to the absorption of the spectral portion of solar radiation extending in the ultraviolet and prevents the propagation of this portion inside the display 2.

Thus, the combination of two filters which are simple to manufacture makes it possible to attenuate the solar load and protect the components of the display 2 while at the same time preserving the color quality of the virtual image viewed by the observer 3.

In a variant of the third embodiment, the attenuation of the solar load is improved by using a third spectral filter F3 applied to one from the first reflector 6 and the second reflector 7. The third spectral filter is a band-stop spectral filter. Recall that what is meant by band-stop filter is a filter which prevents the propagation of wavelengths of a determined spectral band along the optical path L as defined above. Here, the third spectral filter F3 transmits or, as a variant, absorbs the spectral band extending between 450 nm (blue component) and 530 nm (green component). The spectral portion of solar radiation extending between these two components is not reflected and is therefore stopped while propagating inside the display 2 (by the first reflector 6 or the second reflector 7 according to the circumstances). Thus, in this variant, the light beam emitted by the image-generating device 40 propagates as a whole from the inner end toward the outer end of the optical path L. The quality of the virtual image, notably the color quality, is therefore preserved.

In parallel, the ultraviolet spectral portion, the spectral portion extending between 450 nm (blue component) and 530 nm (green component), the spectral portion extending between 530 nm (green component) and 650 nm (red component) and the spectral portion extending beyond 700 nm, in the infrared, of solar radiation do not propagate as far as the image-generating device 40 of the display 2. Thus, the solar load is attenuated optimally by using three filters which are simple to manufacture and while preserving the color quality of the virtual image viewed by the observer 3.

FIG. 6 illustrates the transmission spectra of the first spectral filter F1 and of the second spectral filter F2 and the reflection spectrum of the third spectral filter F3 according to this variant of the third embodiment. Here again it may be observed, on the curve $F_{TOT}$, that the combination of the first spectral filter F1 with the second spectral filter F2 makes it possible to let the red spectral component $\lambda_R$, the green spectral component $\lambda_V$ and the blue spectral component $\lambda_B$ pass.

Thus, the solution provided by the invention makes it possible to reduce the solar load of a head-up display, and therefore to preserve its components, notably the image-generating device of the display, using a small number of spectral filters which are simple to manufacture and therefore inexpensive with respect to the solutions of the prior art.

The invention claimed is:

1. A head-up display comprising, inside a housing:

an image-generating device configured to generate a light beam which passes through an optical output element, the light beam comprising a green component and a red component;

a first reflector configured to reflect the light beam as an intermediate beam;

a second reflector configured to reflect the intermediate beam as an output beam, the housing comprising an opening closed by a window through which the output beam passes, wherein the propagation of light through the optical output element, in reflection on the first reflector, in reflection on the second reflector and through the window, defines an optical path with two ends, wherein two elements from the optical output element, the first reflector, the second reflector and the window are provided, respectively, with a first spectral filter and with a second spectral filter, the first spectral filter and the second spectral filter are configured to prevent the propagation, from one end to the other of the optical path, of a spectral component extending spectrally between the green component and the red component.

2. The head-up display as claimed in claim 1, wherein the first spectral filter and the second spectral filter are configured to prevent the propagation, from one end to the other of the optical path, of another spectral component extending spectrally over the infrared spectrum.

3. The head-up display as claimed in claim 1, wherein one spectral filter from the first spectral filter and the second spectral filter is a band-stop filter and in that the other spectral filter is a low-pass filter.

4. The head-up display as claimed in claim 1, wherein the two elements are the first reflector and the second reflector.

5. The head-up display as claimed in claim 1, wherein the two elements are one from the first reflector and the second reflector, and the window.

6. The head-up display as claimed in claim 1, wherein the two elements are one from the first reflector and the second reflector, and the optical output element.

7. The head-up display as claimed in claim 1, wherein the two elements are the optical output element and the window.

8. The head-up display as claimed in claim 1, wherein:

the light beam comprises a blue component, an additional element from the optical output element, the first reflector, the second reflector and the window, which is different from the two elements, is provided with a third spectral filter, and the third spectral filter is configured to prevent the propagation, from one end to the other of the optical path, of a spectral component extending spectrally between the blue component and the green component.

9. The head-up display as claimed in claim 8, wherein the third spectral filter is a band-stop filter.

* * * * *